US011825769B2

(12) United States Patent
Gross et al.

(10) Patent No.: US 11,825,769 B2
(45) Date of Patent: Nov. 28, 2023

(54) CONDITIONING ROLLER ASSEMBLY

(71) Applicant: DEERE & COMPANY, Moline, IL (US)

(72) Inventors: Stefan Gross, Riegelsberg (DE); Matthew Dold, Homburg (DE); Maximilian Frenzel, Muenchweiler an der Rodalb (DE)

(73) Assignee: DEERE & COMPANY, Moline, IL (US)

( * ) Notice: Subject to any disclaimer, the term of this patent is extended or adjusted under 35 U.S.C. 154(b) by 684 days.

(21) Appl. No.: 16/947,681

(22) Filed: Aug. 12, 2020

(65) Prior Publication Data

US 2021/0092903 A1  Apr. 1, 2021

(30) Foreign Application Priority Data

Sep. 30, 2019 (DE) .......................... 102019215028.4

(51) Int. Cl.
*A01D 43/10* (2006.01)
*A01D 82/02* (2006.01)

(52) U.S. Cl.
CPC ........... *A01D 43/107* (2013.01); *A01D 82/02* (2013.01)

(58) Field of Classification Search
CPC .... A01D 43/006; A01D 43/10; A01D 43/107; A01D 43/088; A01D 82/00; A01D 82/02
See application file for complete search history.

(56) References Cited

U.S. PATENT DOCUMENTS

| | | | | | |
|---|---|---|---|---|---|
| 3,402,532 A | * | 9/1968 | Johnston | ............... | A01D 43/10 56/DIG. 1 |
| 3,472,003 A | * | 10/1969 | Case | ..................... | A01D 82/00 56/DIG. 1 |
| 4,472,927 A | * | 9/1984 | Vogt | ....................... | A01D 82/00 56/DIG. 1 |
| 4,499,711 A | * | 2/1985 | McLean | ................ | A01D 43/10 56/180 |
| 4,860,528 A | * | 8/1989 | Seymour | ............... | A01D 82/02 56/DIG. 1 |
| 4,896,483 A | * | 1/1990 | O'Halloran | ............ | A01D 82/00 56/DIG. 1 |
| 5,033,257 A | * | 7/1991 | Walters | ................ | A01D 43/107 100/169 |

(Continued)

FOREIGN PATENT DOCUMENTS

| | | | | |
|---|---|---|---|---|
| CA | 2709336 A1 | * | 1/2012 | ............ A01D 82/02 |
| EP | 2098110 A2 | | 9/2009 | |

(Continued)

*Primary Examiner* — Adam J Behrens

(57) ABSTRACT

A conditioning roller assembly includes two conditioning rollers which are rotatably mounted on associated bearing arrangements, and a holder which includes a first holder component and a second holder component that are connected together by a hinge and a spring arrangement for providing a pre-tensioning of the conditioning rollers. The first holder component is releasably connected to the first bearing arrangement, the second holder component is releasably connected to the second bearing arrangement, and the conditioning rollers, with the bearing arrangements, are detachable in each case from the components without the holder being disassembled.

11 Claims, 7 Drawing Sheets

(56) References Cited

U.S. PATENT DOCUMENTS

| | | | | |
|---|---|---|---|---|
| 5,269,124 | A * | 12/1993 | Barthel | A01D 82/00 |
| | | | | 56/16.4 B |
| 6,711,996 | B1 * | 3/2004 | Mackie | A01D 82/02 |
| | | | | 56/16.4 B |
| 7,681,384 | B2 * | 3/2010 | Scherer | A01D 82/00 |
| | | | | 56/16.4 B |
| 9,648,809 | B2 * | 5/2017 | Pruitt | A01D 43/102 |
| 2004/0255566 | A1 * | 12/2004 | Phillips | A01D 82/00 |
| | | | | 56/16.4 R |
| 2006/0123759 | A1 * | 6/2006 | Fox | A01D 82/02 |
| | | | | 56/16.4 C |
| 2007/0079592 | A1 * | 4/2007 | Pruitt | A01D 43/10 |
| | | | | 56/16.4 C |
| 2012/0266581 | A1 * | 10/2012 | Dreer | B30B 3/04 |
| | | | | 56/16.4 B |
| 2014/0102067 | A1 * | 4/2014 | Barnett | A01D 43/10 |
| | | | | 56/16.4 C |
| 2017/0251604 | A1 * | 9/2017 | Dreer | A01D 43/10 |
| 2018/0328470 | A1 * | 11/2018 | Rotole | A01D 43/10 |
| 2019/0029182 | A1 * | 1/2019 | Glade | F15B 1/033 |
| 2020/0323137 | A1 * | 10/2020 | Bode Mortensen | A01D 82/02 |

FOREIGN PATENT DOCUMENTS

| | | | |
|---|---|---|---|
| EP | 2363016 | A1 | 9/2011 |
| EP | 2364586 | A1 | 9/2011 |
| EP | 2532222 | A1 | 12/2012 |
| WO | WO2012010396 | A1 | 1/2012 |

* cited by examiner

CONDITIONING ROLLER ASSEMBLY

CROSS-REFERENCE TO RELATED APPLICATIONS

This application claims priority to and the benefit of German Patent Application DE 102019215028.4, filed on Sep. 30, 2019, the disclosure of which is hereby incorporated by reference.

TECHNICAL FIELD

The disclosure generally relates to a conditioning roller assembly, and a forage harvester including the conditioning roller assembly.

BACKGROUND

Forage harvesters serve for harvesting whole plants or parts thereof, which during operation are picked up from a field by means of a harvesting attachment, compressed by pre-compression rollers and supplied to a knife drum, the chopping blades thereof comminuting the plants in cooperation with a countercutter. Subsequently, the comminuted plants or plant parts are optionally supplied to a conditioning roller assembly and conveyed by a post-accelerating device into an ejection elbow which loads the plants onto a transport vehicle. The harvested plants generally serve as cattle fodder or for biogas production. The conditioning roller assembly comprises two or more conditioning rollers which are driven in opposing directions, which are mounted so as to be movable relative to one another and which are pretensioned relative to one another by a force, the chopped crops being passed between the conditioning rollers. The conditioning roller assembly is used in maize harvesting in order to crack or fracture the grains contained in the chopped crops and to improve the digestibility of the fodder.

In the prior art, the conditioning roller assembly is made up of holders which are constructed from two components, in each case a roller being rotatably supported thereon. The components of the holder are rotatable relative to one another about an axis running parallel to the longitudinal axis of the conditioning rollers and are pretensioned relative to one another by springs (e.g., EP 2 098 110 A2) or hydraulic cylinders (e.g., WO 2012/010396 A1). In other embodiments, one roller is mounted so as to be displaceable in a linear manner relative to the other roller (e.g., U.S. Pat. No. 7,681,384 B2 or EP 2 532 222 A1).

The displaceable arrangements of the conditioning rollers make it possible to fold up one of the components of the holder after dismantling the conditioning roller assembly from the forage harvester for the purpose of replacing or servicing the conditioning rollers, but have the drawback that a linear displacement may easily lead to the canting of the movable roller when the throughput of crops is not uniform over the width of the conditioning roller assembly. Moreover, the linear displaceability is more difficult to implement structurally than a rotatable mounting of the components of the holder of the conditioning roller assembly.

In conditioning roller assemblies which have components of the holder which are rotatably arranged relative to one another, a roller has to be dismantled in each case from a component of the holder for servicing and replacement purposes. In the conditioning roller assembly shown in EP 2 098 110 A2, which is regarded as generic, this is possible in a relatively simple manner in the case of one of the conditioning rollers since this roller may be detached from the holder—after releasing four screw connections—together with the associated bearing assemblies and a cover of the conditioning roller. However, in the case of the other conditioning roller, the ends thereof extending through holes in side walls of a component of the holder and the bearing being attached to the outer face thereof, initially the entire holder including the spring and the rotary bearing has to be dismantled before the conditioning roller may be removed, which proves to be extremely time-consuming. The reassembly is similarly complex. Accordingly, it would be desirable to improve a conditioning roller assembly of the type mentioned above such that a dismantling and mounting of the conditioning rollers is simplified.

SUMMARY

A conditioning roller assembly for a forage harvester is provided. The conditioning roller assembly processes crop material harvested by the forage harvester. The conditioning roller assembly includes a first conditioner roller rotatably mounted on a first bearing arrangement, and a second conditioner roller rotatably mounted on a second bearing arrangement. A first holder component and a second holder component are connected together. At least one of the first holder component and the second holder component is moveable relative to the other of the first holder component and the second holder component about a hinge axis. The hinge axis is disposed parallel to longitudinal axes of the first conditioner roller and the second conditioner roller respectively. The first bearing arrangement is releasably connected to the first holder component. A third holder component is releasably attached to the second holder component. The second bearing arrangement is releasably connected to the third holder component such that the second conditioner roller and the second bearing arrangement are removable by disconnecting the third holder component from the combination of the first holder component and the second holder component without disconnecting the second holder component and the first holder component from each other.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

Figure 1:
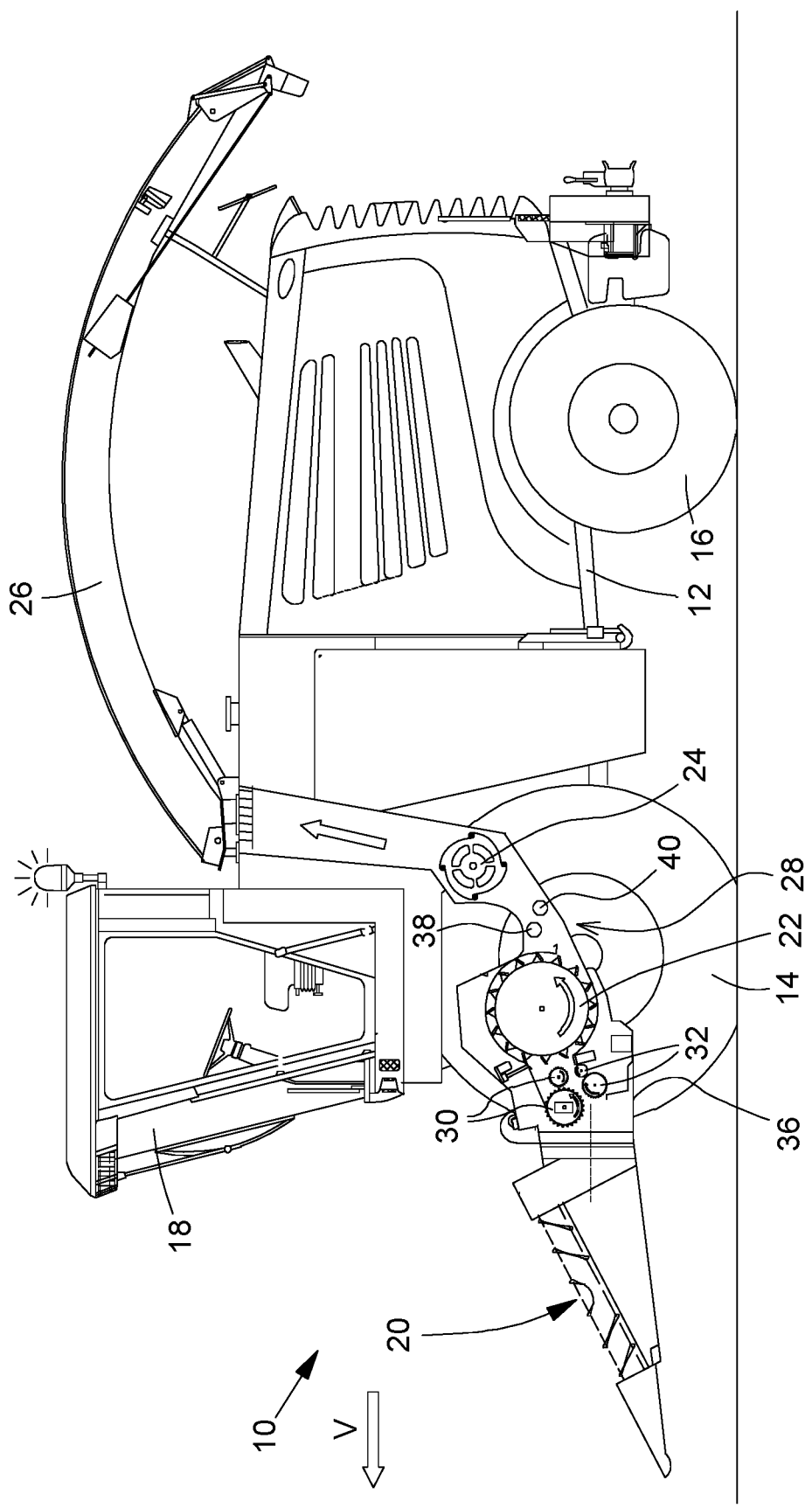
FIG. 1 is a schematic side view of a forage harvester.
Figure 2:
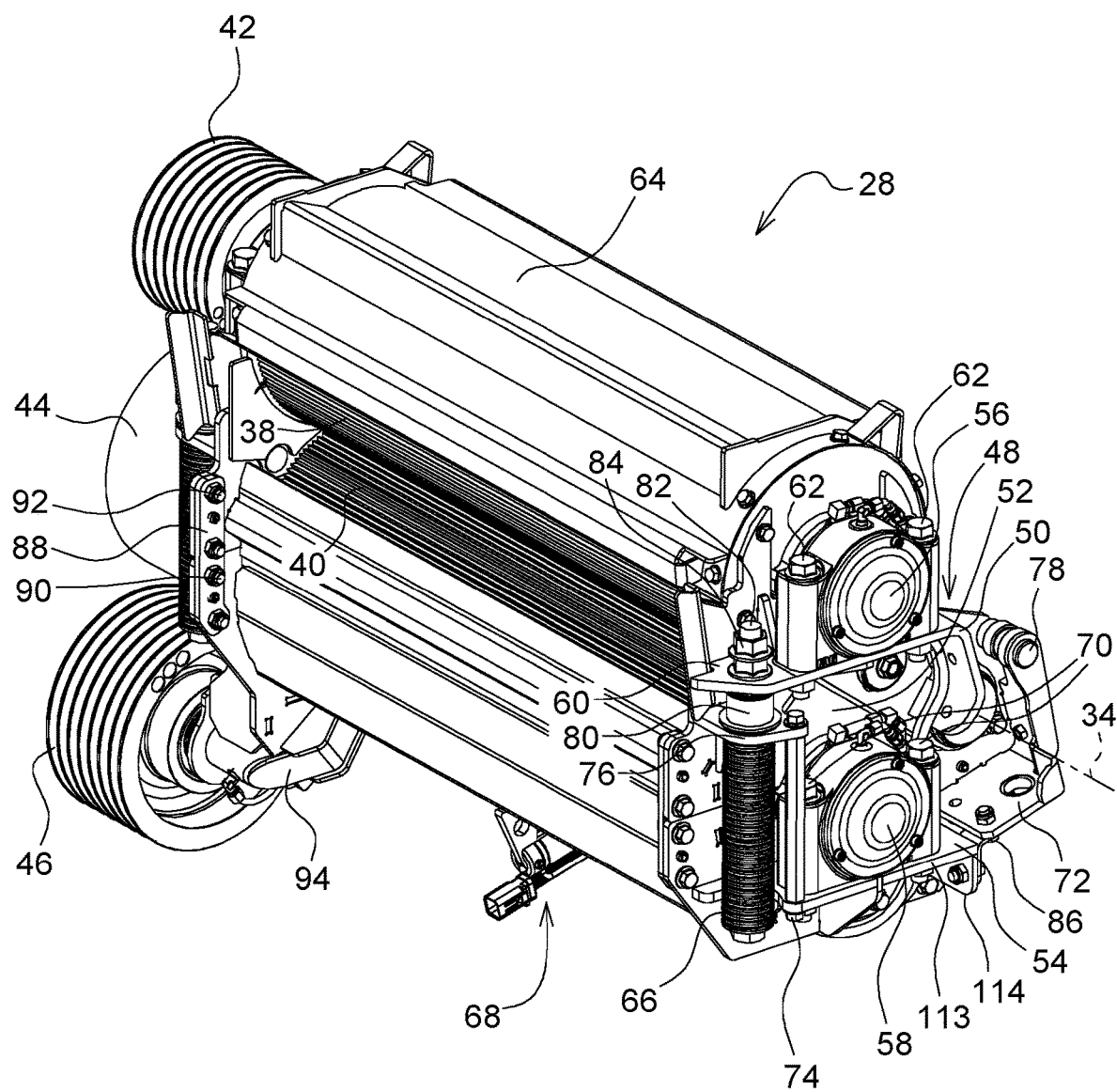
FIG. 2 is a schematic perspective view of a conditioning roller assembly of the forage harvester in a mounted state.

Referring to the Figures, wherein like numerals indicate like parts throughout the several views, a self-propelled forage harvester is generally shown at 10 in FIG. 1. Referring to FIG. 1, the self-propelled forage harvester is constructed on a frame 12 which is borne by driven front wheels 14 and steerable rear wheels 16. The operation of the forage harvester 10 is carried out from a driver's cab 18, a harvesting attachment 20 which is suitable for harvesting stalk-like plants being visible therefrom. By means of the harvesting attachment 20, which in the embodiment shown is a maize chopper working independently of the rows, crops picked up from the ground, for example maize, cereals or the like, are supplied by upper pre-compression rollers 30 and lower pre-compression rollers 32 arranged in a feeder assembly 36 to a chopping drum 22. The chopping drum 22 chops the crops into small pieces and dispenses the crops to a conveying device 24. The crops pass from the forage harvester 10 to a trailer travelling adjacent thereto via a discharge device 26 which is adjustable in terms of its position. A conditioning roller assembly 28, by which the crops to be conveyed are supplied to the conveying device 24 in a tangential manner, extends between the chopping drum 22 and the conveying device 24. Directional information—unless mentioned otherwise—such as front, rear, left and right, refers hereinafter to the forward direction V of the forage harvester 10 which in FIG. 1 runs from right to left.

The conditioning roller assembly 28 is shown in FIGS. 2 to 6. The conditioning roller assembly 28 includes a first conditioning roller 38 and a second conditioning roller 40 which in harvesting mode cooperate with one another in order to pound the grains contained in the chopped harvested crops. The drive of the conditioning rollers 38, 40 is implemented via belt pulleys 42, 44 which are driven via a belt (not shown) of a belt pulley system which is connected to a shaft of the conveying device 24. The belt pulley 44 is smooth since during operation it cooperates with the rear face of the belt. The shaft of the conveying device 24 is driven in a manner known per se by a belt drive which also connects the internal combustion engine of the forage harvester 10 to a shaft of the chopping drum 22. A freely running guide roller 46 for the belt, serving as the drive of the conditioning rollers 38, 40, is connected via an arm 94 to the conditioning roller assembly 28. The belt serving as a drive for the conditioning rollers 38, 40 is tensioned in a manner known per se, a further freely running roller (not shown) or the guide roller 46 being able to be used therefor. Whilst the conditioning rollers 38, 40 in FIGS. 2 to 6 are shown superimposed they may also be spaced apart horizontally and/or arranged on a line running obliquely to the front and upwardly, as shown in FIG. 1. The conditioning roller assembly 28 may be dismantled as a whole from the forage harvester 10 in a manner known per se (see EP 2 364 586 A1 and EP 2 363 016 A1). It might also be conceivable to change the position of the conditioning rollers 38, 40 in FIG. 1.

The conditioning rollers 38, 40 are fastened to a holder 48 which in turn comprises a first holder component 50, a second holder component 52 and a third holder component 54.

A first bearing arrangement 56 is fastened by screws 62 to a flange 60 of the first holder component 50. The first bearing arrangement 56 serves for the rotatable support of the first conditioning roller 38 on the first holder component 50. A cover 64 of the first conditioning roller 38 is also removably fastened to the first holder component 50.

The second holder component 52, as may be identified with reference to the following figures and description, is pivotable relative to the first holder component 50 about a hinge axis 34 extending parallel to the axes of the conditioning rollers 38, 40 and is pretensioned relative to the first holder component 50 by a spring arrangement 66 which also could be replaced or supplemented by a hydraulic cylinder (which could also act on a clamping roller of the belt for driving the rollers 38, 40). The spring arrangement 66, constructed in the example shown from disc springs, pretensions the conditioning rollers 38, 40 relative to one another during operation such that, according to the throughput of harvested crop, the conditioning rollers are able to move apart counter to the force of the spring arrangement 66. An eccentric mechanism is connected to an actuator unit 68 in order to adjust the slightest possible gap between the conditioning rollers 38, 40. This eccentric mechanism is shown in more detail in FIGS. 5 to 7 and varies the position of the rotational hinge axis 34 of the second holder component 52 relative to the first holder component 50. A ring 80 is arranged between the flange 60 of the first holder component 50 and a flange 76 which is assigned to the second holder component 52 in order to define the path of the spring arrangement 66 inwardly (and thus also the shortest spacing between the conditioning rollers 38, 40). The upper end of the spring arrangement 66 bears against the side of the flange 76 remote from the ring 80, the other end thereof being supported via a bolt 82 and a nut arrangement 84 on the upper face of the flange 60 of the first holder component.

The second conditioning roller 40 is supported on a second bearing arrangement 58, which in turn is fastened by screws 70 to the third holder component 54. The third holder component 54 in turn is releasably fastened (by screws) to the second holder component 52 and namely, on the one hand, fastened by a lengthy bolt 74 to the flange 76 which protrudes laterally from the second holder component 52 and, on the other hand, via an angle bracket 86 to a holding plate 72 coupled to the second holder component 52, which is connected to a mounting arrangement 78 which serves for supporting the conditioning roller assembly 28 when the conditioning roller assembly 28 is mounted onto and dismantled from the forage harvester 10. A further releasable attachment of the third holder component 54 to the second holder component 52 is implemented by a strip 88 which is connected by screws 90 to the lateral wall of the third holder component 54 and the lateral wall of the second holder component 52 on its side adjacent to the spring arrangement. The arm 94 of the guide roller 46 is also fastened to the third holder component 54.

The disclosed first and second bearing arrangements 56, 58 and structural elements of the first, second and third holder components 50, 52, 54 in each case are located at both ends of the conditioning rollers 38, 40.

Figure 3:
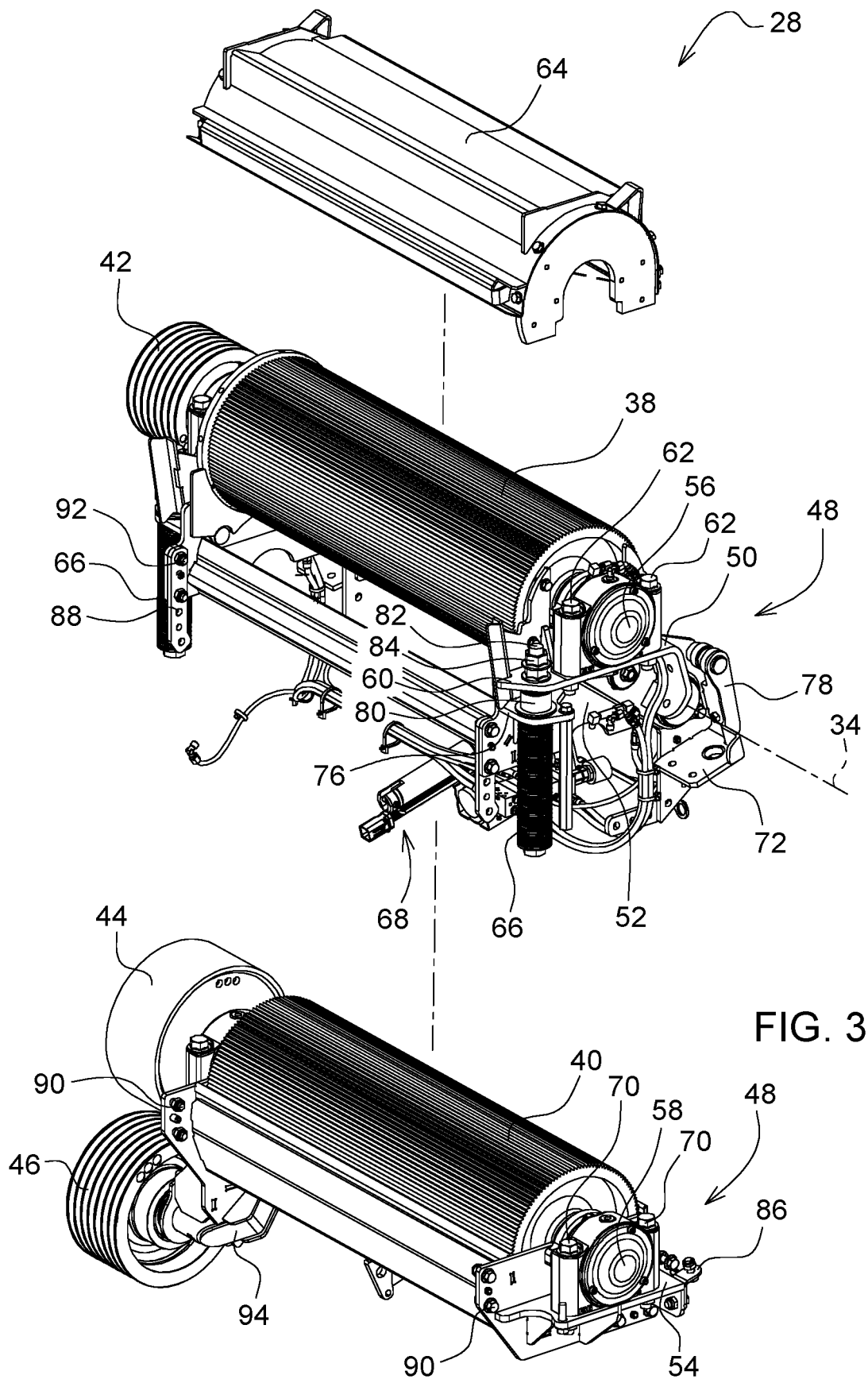
FIG. 3 is a schematic perspective view of the conditioning roller assembly with a cover of a first conditioning roller removed and a second conditioning roller detached from a second holder component of a holder.
Figure 4:
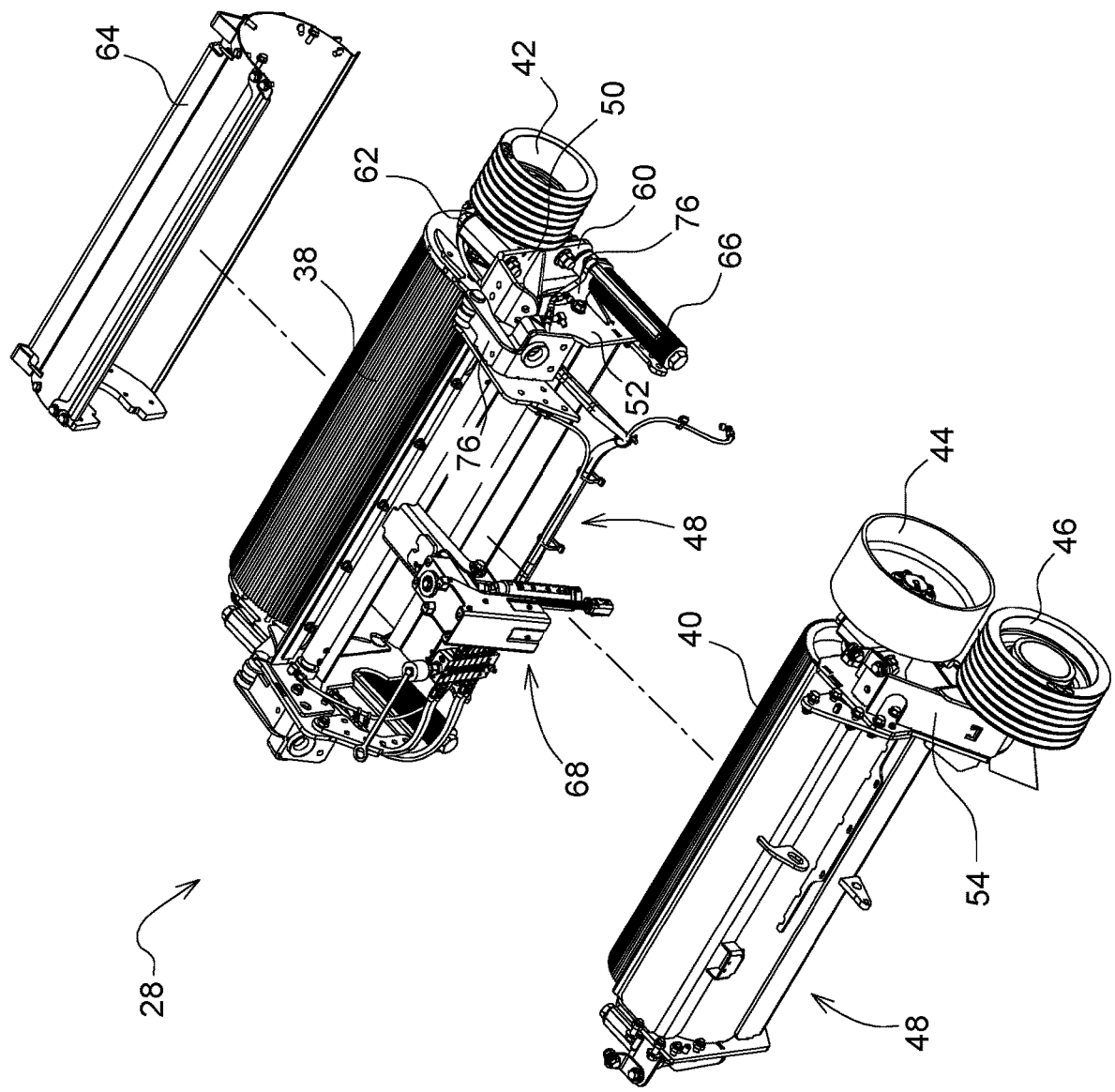
FIG. 4 is a schematic perspective view according to FIG. 3 from another side.

FIGS. 3 and 4 show the conditioning roller assembly 28 in the exploded state which makes it possible to dismantle and to replace the conditioning rollers 38, 40 as required. To this end, for dismantling the first conditioning roller 38 only the cover 64 has to be dismantled and the screws 62 released and removed, so that the connection between the first bearing arrangement 56 and the first holder component 50 is released. In contrast to the prior art according to EP 2 098 110 A2, the second conditioning roller 40 may also be dismantled relatively rapidly and easily and, in particular, without dismantling the holder 48, by the third holder component 54 being initially detached from the second holder component 52 (by releasing and removing the screws 90 and the screw connection of the bolt 74 and the angle bracket 86) so that subsequently the screws 70 are freely accessible in order to release the connection between the second bearing arrangement 58 and the third holder component 54 and to remove the second conditioning roller 40. A disassembly of the holder 48 which is still required in the prior art is thus eliminated. The reassembly takes place in the reverse order.

Figure 5:
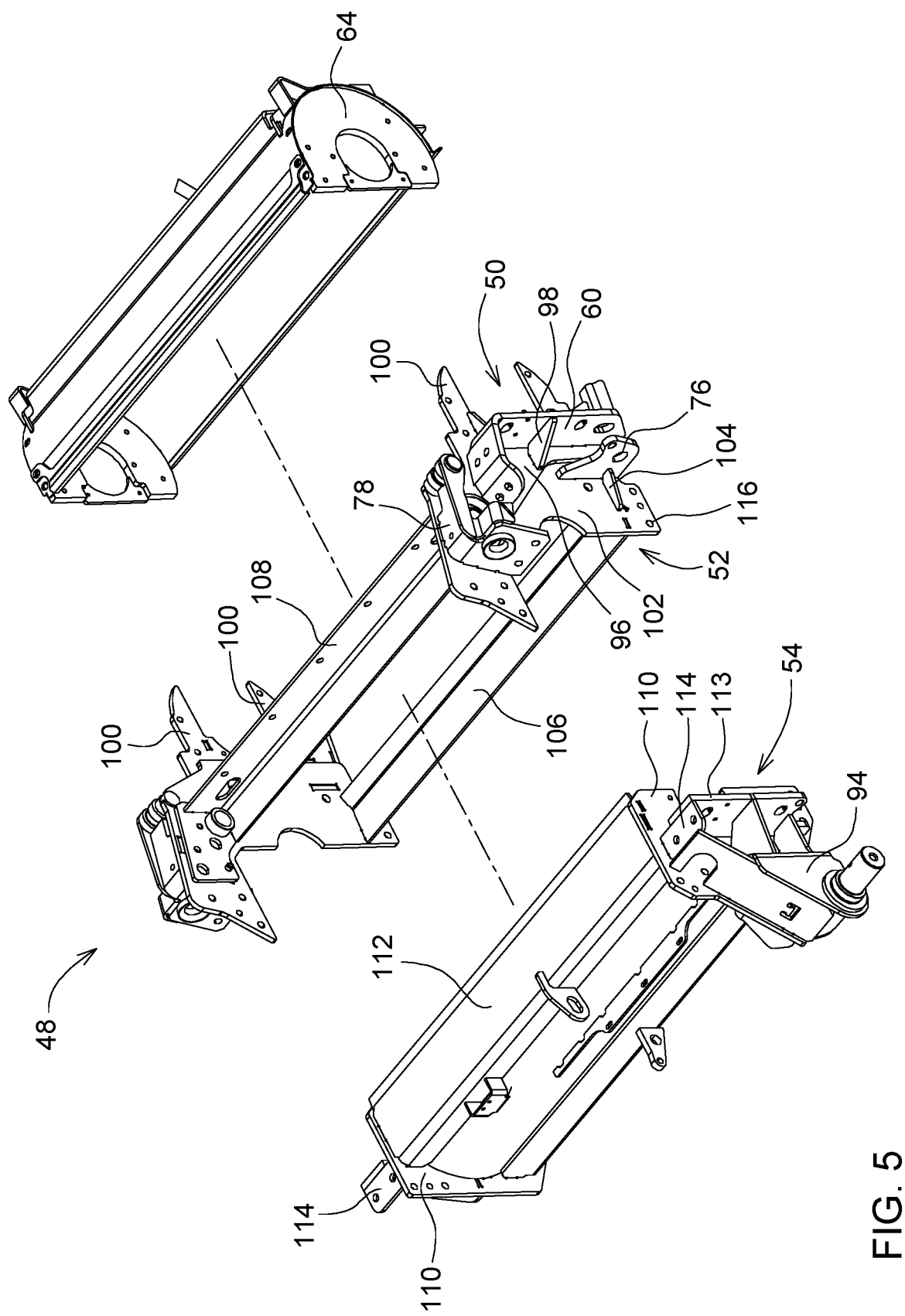
FIG. 5 is a schematic perspective view of the cover of the first conditioning roller, of the first and second holder components of the holder and of the third holder component of the holder for receiving the second conditioning roller in the detached state relative to one another.

FIG. 5 shows the components 50 to 54 with the dismantled conditioning rollers 38, 40. The first holder component 50 comprises two side walls 96 which are pivotably connected by the eccentric mechanism (shown in FIGS. 6 and 7) to the second holder component 52 and onto which in each case the flange 60 is welded, by using a reinforcing plate 98. Moreover, holders 100 protrude from the side walls 96, the first bearing arrangement 56 being received therebetween. The two side walls 96 of the first holder component 50 are provided, in each case the side walls being arranged at an end of the first conditioning roller 38 and not being connected together directly (but via the second holder component 52).

The second holder component 52 also includes two side walls 102, in each case the flange 76 being welded thereto on the outer face by using a supporting plate 104. The two side walls 102 of the second holder component 52 are connected together by transverse strips 106, 108 designed as angle sections.

The third holder component 54 also includes two side walls 110 which are connected together by a cover 112 of the second conditioning roller 40. Flanges 113, 114 extend outwardly from the side walls 110. The connection to the second holder component 52 is made by the flanges 113, 114, the bolt 74, and the angle bracket 86, whilst the third connection to the second holder component 52 is made directly on the side wall 110 via the strip 88, with the screws 90, 92 extending through holes 116 in the side walls 102 of the second holder component 52 and the side walls 110 of the third holder component 54.

Figure 6:
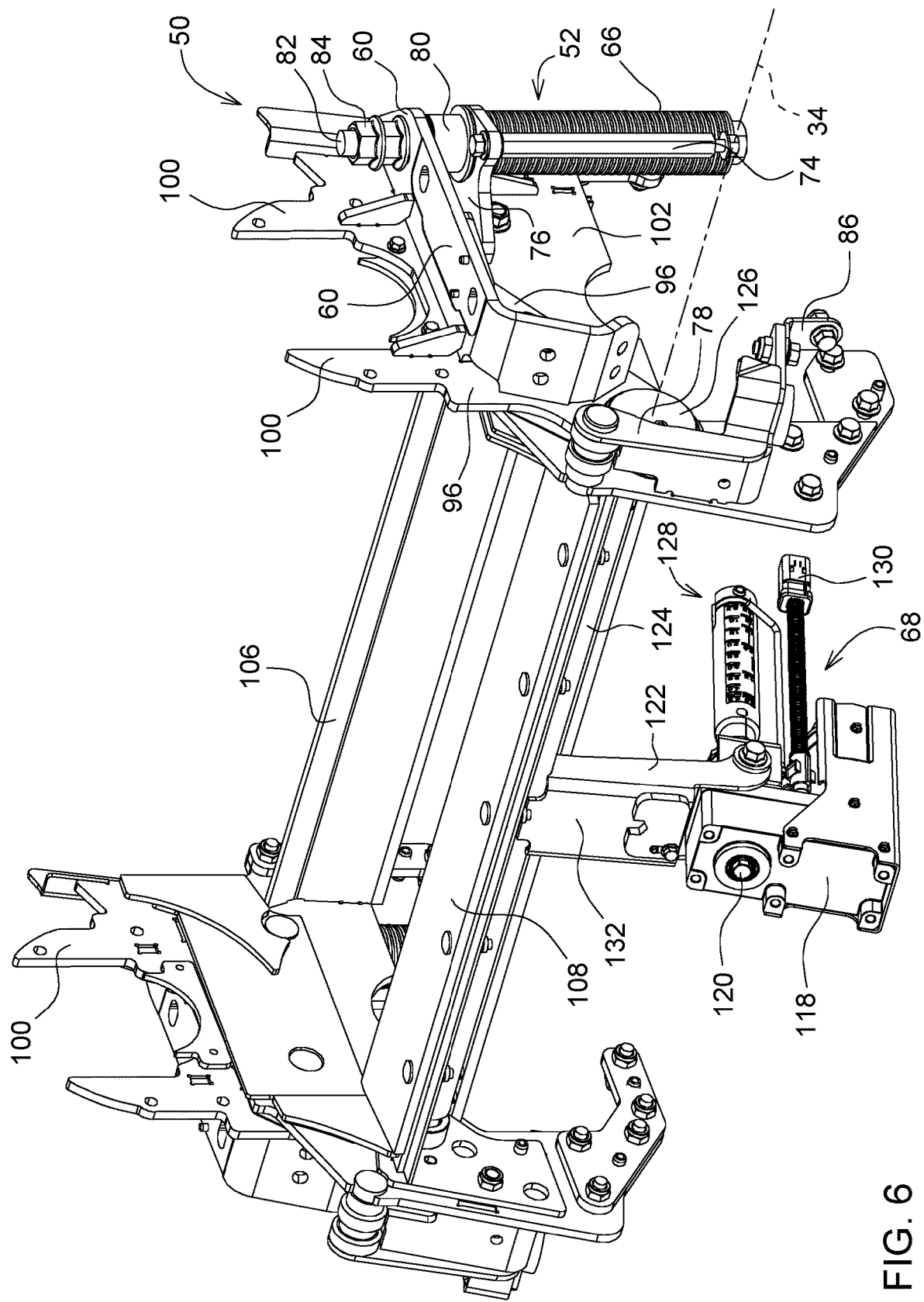
FIG. 6 is a schematic perspective view of the first and second holder component of the holder in the mounted state.
Figure 7:
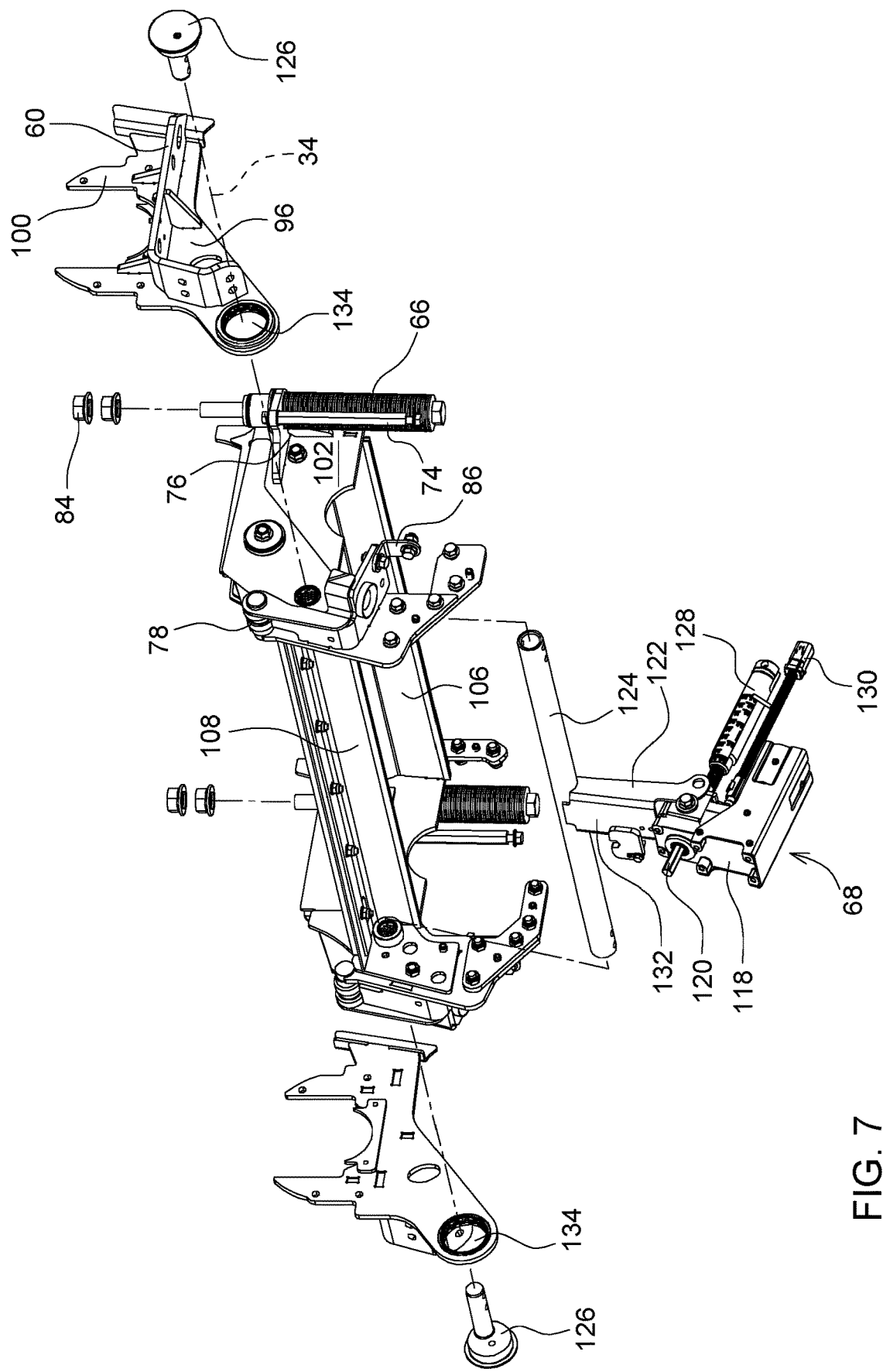
FIG. 7 is a schematic perspective view of the first and second holder components of the holder in the mounted state.

FIG. 6 shows the first holder component 50 and second holder component 52 in the assembled state whilst FIG. 7 shows these components in the exploded state. The actuator unit 68 comprises an actuating motor 118, the housing thereof being connected via an arm 132 to the transverse strip 108. The actuating motor 118 which is connected to a cable 130 has an output shaft 120 which is coupled to a spindle drive 128, which converts the rotational movement of the shaft 120 into a linear movement and transmits this movement to a lever 122 which is coupled to a shaft 124 extending transversely between the side walls 102 of the second holder component 52. The shaft 124, on the one hand, is mounted on the side walls 102 so as to be rotatable about its longitudinal axis and, on the other hand, is connected to eccentrics 126 which in each case are located in a corresponding opening 134 (see FIG. 7) in the side wall 96 of the first holder component 50. As a result, the above-described adjustment of the smallest possible gap between the conditioning rollers 38, 40 is possible and the aforementioned rotation of the second holder component 52 relative to the first holder component 50 is possible about the hinge axis 34 extending parallel to the axis of the conditioning rollers 38, 40, since the eccentric 126 forms with the opening 134 the hinge about which the components 50, 52 are rotatable relative to one another. The actuation of the actuating motor 118 may be carried out by an operator by means of an interface arranged in the cab 18 or by an automated system based on properties of the harvested crops detected by sensors.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A conditioning roller assembly for processing crop material, the conditioning roller assembly comprising:
 a first conditioner roller rotatably mounted on a first bearing arrangement;
 a second conditioner roller rotatably mounted on a second bearing arrangement;
 a first holder component and a second holder component connected together with at least one of the first holder component and the second holder component moveable relative to the other of the first holder component and the second holder component about a hinge axis disposed parallel to longitudinal axes of the first conditioner roller and the second conditioner roller respectively;
 wherein the first bearing arrangement is releasably connected to the first holder component;
 a third holder component releasably attached to the second holder component; and
 wherein the second bearing arrangement is releasably connected to the third holder component such that the second conditioner roller and the second bearing arrangement are removable by disconnecting the third holder component from a combination of the first holder component and the second holder component without disconnecting the second holder component and the first holder component from each other.

2. The conditioning roller assembly set forth in claim 1, further comprising an actuator unit attached to and interconnecting the first holder component and the second holder component, wherein the actuator unit is operable to adjust a relative position between the first conditioner roller and the second conditioner roller.

3. The conditioning roller assembly set forth in claim 2, further comprising an eccentric connection interconnecting the first holder component and the second holder component, wherein the eccentric connection defines the hinge axis.

4. The conditioning roller assembly set forth in claim 3, further comprising a spring arrangement attached to and interconnecting the first holder component and the second holder component, wherein the spring arrangement is operable to pre-tension the first conditioner roller and the second conditioner roller relative to each other.

5. The conditioning roller assembly set forth in claim 4, wherein the third holder component is detachable from the combination of the first holder component and the second holder component without disconnecting the actuator unit, the eccentric connection or the spring arrangement from the combination of the first holder component and the second holder component.

6. A conditioning roller assembly for processing crop material, the conditioning roller assembly comprising:
a first conditioner roller rotatably mounted on a first bearing arrangement;
a second conditioner roller rotatably mounted on a second bearing arrangement;
a first holder component and a second holder component interconnected by an eccentric connection, wherein the eccentric connection defines a hinge axis disposed parallel to longitudinal axes of the first conditioner roller and the second conditioner roller respectively, with at least one of the first holder component and the second holder component moveable relative to the other of the first holder component and the second holder component about the hinge axis;
wherein the first bearing arrangement is releasably connected to the first holder component;
a third holder component releasably attached to the second holder component, wherein the second bearing arrangement is releasably connected to the third holder component;
an actuator unit attached to and interconnecting the first holder component and the second holder component, wherein the actuator unit is operable to adjust a relative position between the first conditioner roller and the second conditioner roller;
a spring arrangement attached to and interconnecting the first holder component and the second holder component, wherein the spring arrangement is operable to pre-tension the first conditioner roller and the second conditioner roller relative to each other; and
wherein the third holder component is detachable from a combination of the first holder component and the second holder component such that the second conditioner roller and the second bearing arrangement are removable by disconnecting the third holder component from the combination of the first holder component and the second holder component without disconnecting the second holder component and the first holder component from each other, and without disconnecting the actuator unit, the eccentric connection or the spring arrangement from the combination of the first holder component and the second holder component.

7. A forage harvester comprising:
a frame;
a harvesting attachment operable to harvest crop material;
a conditioning roller assembly positioned to receive the crop material from the harvesting attachment, wherein the conditioning roller assembly includes:
a first conditioner roller rotatably mounted on a first bearing arrangement;
a second conditioner roller rotatably mounted on a second bearing arrangement;
a first holder component and a second holder component connected together with at least one of the first holder component and the second holder component moveable relative to the other of the first holder component and the second holder component about a hinge axis disposed parallel to longitudinal axes of the first conditioner roller and the second conditioner roller respectively;
wherein the first bearing arrangement is releasably connected to the first holder component;
a third holder component releasably attached to the second holder component; and
wherein the second bearing arrangement is releasably connected to the third holder component such that the second conditioner roller and the second bearing arrangement are removable by disconnecting the third holder component from a combination of the first holder component and the second holder component without disconnecting the second holder component and the first holder component from each other.

8. The forage harvester set forth in claim 7, wherein the conditioning roller assembly further includes an actuator unit attached to and interconnecting the first holder component and the second holder component, wherein the actuator unit is operable to adjust a relative position between the first conditioner roller and the second conditioner roller.

9. The forage harvester set forth in claim 8, wherein the conditioning roller assembly further includes an eccentric connection interconnecting the first holder component and the second holder component, wherein the eccentric connection defines the hinge axis.

10. The forage harvester set forth in claim 8, wherein the conditioning roller assembly further includes a spring arrangement attached to and interconnecting the first holder component and the second holder component, wherein the spring arrangement is operable to pre-tension the first conditioner roller and the second conditioner roller relative to each other.

11. The forage harvester set forth in claim 9, wherein the third holder component is detachable from the combination of the first holder component and the second holder component without disconnecting the actuator unit, the eccentric connection or the spring arrangement from the combination of the first holder component and the second holder component.

* * * * *